United States Patent [19]

Simmons

[11] 4,300,722
[45] Nov. 17, 1981

[54] VEHICLE TRACTION MAT

[75] Inventor: Robert Simmons, Chicago, Ill.

[73] Assignee: Vision Metal Fabricators Corporation, Chicago, Ill.

[21] Appl. No.: 168,755

[22] Filed: Jul. 11, 1980

[51] Int. Cl.³ .............................................. E01B 23/00
[52] U.S. Cl. ........................................... 238/14; 254/1
[58] Field of Search ................. 254/88, 1; 188/32, 36; 238/14; 152/208, 213 R; 248/188.2, 615, 632, 638; 248/188.2, 615, 632, 638

[56] References Cited

U.S. PATENT DOCUMENTS

| | | | |
|---|---|---|---|
| 1,574,729 | 2/1926 | Foster | 238/14 |
| 3,025,002 | 3/1962 | Kunz | 238/14 |
| 3,357,639 | 12/1967 | Peterson | 238/14 |
| 3,878,988 | 4/1975 | Blais | 238/14 |
| 3,910,491 | 10/1975 | Ducharme | 238/14 |
| 3,917,227 | 11/1975 | West | 254/88 |
| 4,034,961 | 7/1977 | Breen | 254/88 X |

Primary Examiner—Robert C. Watson
Attorney, Agent, or Firm—Leydig, Voit, Osann, Mayer & Holt, Ltd.

[57] ABSTRACT

A traction mat to aid vehicle wheels for driving out of ice, snow, mud or sand and the like that is an elongated unitary stamped metal structure which is generally rectangular and having a forward inwardly tapered end portion with the mat including a plurality of upwardly extending flanges disposed at 90° with respect to the planer surface and a plurality of downwardly projecting V-shaped gripping lugs. The mat outer side edges are formed with trough shaped ribs for stiffening and the upwardly extending flanges and downwardly shaped gripping lugs are provided with structurally formed ribbing to increase the rigidity for placement and use in a variety of terrains.

4 Claims, 4 Drawing Figures

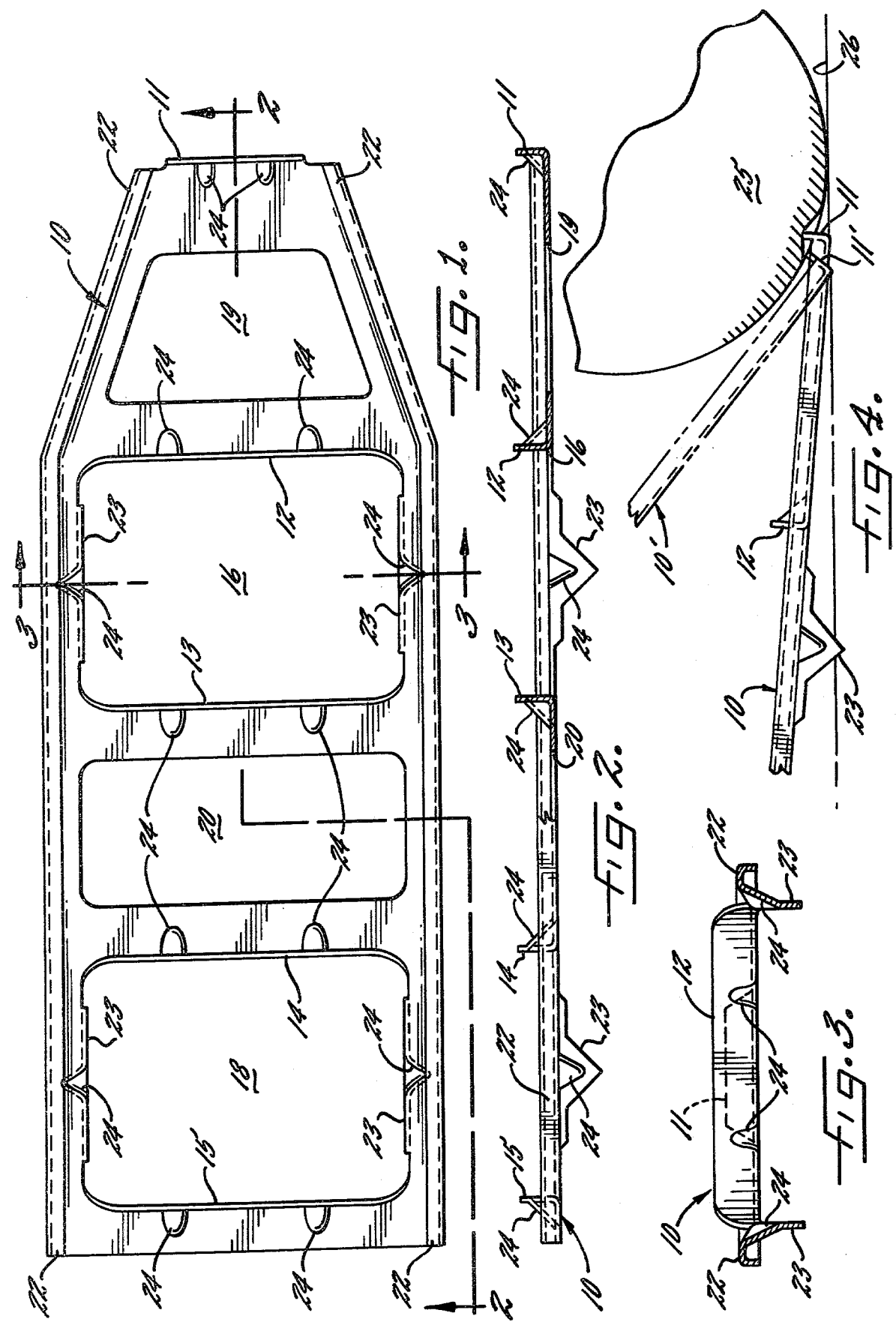

VEHICLE TRACTION MAT

FIELD OF THE INVENTION

The present invention relates generally to traction mats for vehicles and more particularly to an improved unitary, stamped metal construction for a traction mat suitable for aiding vehicles in driving out of ice, snow, mud, or sand and the like.

BACKGROUND OF THE INVENTION

Numerous approaches have been heretofore tried to provide portable traction mats that will aid in getting a stuck vehicle out of the typically encountered terrain situations where drive wheels will merely spin without gaining any traction. Although such devices have been introduced in the marketplace, insofar as can be ascertained, for one reason or another a continuously viable construction does not appear to have come about.

Thus, it is one of the main objects of the present invention to provide an improved traction mat of simple, unitary stamped, metal construction which is inherently strong and rigid and which is suitable for aiding the driving wheels of vehicles to obtain traction in a variety of situations such as ice, snow, mud, or sand and the like.

It is another object to provide such a traction mat which is convenient to use, relatively low in cost and more widely adaptable to a variety of traction loss terrains.

It is still another object of the present invention to provide a portable traction mat construction which is also suitable for use as a safety wheel chock such as when the vehicle is being jacked up to service or change tires.

Other objects and advantages of the invention will become apparent upon reading the attached detailed description thereof which is to be read in conjunction with the following drawings depicting an illustrative traction mat according to the invention.

A BRIEF DESCRIPTION OF THE DRAWINGS

FIG. 1 is a top plan view of a traction mat embodying the present invention;

FIG. 2 is a side plan view partly in section and taken along the line 2—2 in FIG. 1;

FIG. 3 is a sectional view taken substantially in the plane of line 3—3 in FIG. 1;

FIG. 4 is a diagrammatic illustration of an exemplary insertion and placement of the instant traction mat with respect to a tire.

SUMMARY OF THE INVENTION

Briefly, and in accordance with the invention, there is provided a traction mat comprising a unitary stamped, elongated metal structure having ribbing and reinforcements that enable the mat to be positioned angularly in a ramp-like fashion beneath a wheel that is without traction and enables the vehicle wheel to be driven over ramp-like upwardly bent spaced flanges that provide the traction for the wheel. The underside of the mat includes a plurality of downwardly projecting V-shaped gripping lugs which aid in the operation of the mat and prevent it from simply being pulled through and shot out by a driven tire.

While the invention will be described in connection with a certain preferred embodiment, it will be understood that it is not intended to limit the invention to that embodiment. On the contrary, it is intended to cover all alternatives, modifications and equivalents as may be included within the spirit and scope of the invention.

DETAILED DESCRIPTION

Turning to the figures, there is shown, in FIG. 1, a typical traction mat incorporating the present invention, the mat here being an elongated unitary formed metal member, indicated at 10, that may be readily made by a stamping operation from a flat sheet of metal. In its preferred form the sheet stock utilized is heavy guage, such as 13 gauge, hot rolled steel.

Dimensionally, merely by way of example, the mat is made approximately 21 inches long by about 9 ¾ inches wide with approximately the rear three quarters, as viewed in FIG. 1, being generally rectangular and the forward quarter tapering inwardly toward the forward end as viewed on the right in FIG. 1. As the traction obtaining elements of the mat, there are provided a plurality of upwardly bent flanges 11–15, there being four in number as here illustrated commencing with flange 11 at the forward end. Each of the flanges, particularly the forwardmost one 11 is preferably oriented at 90° with respect to the planar surface of the mat 10. The flanges 12–13 and 14–15, respectively, are formed adjacent the sides of rectangular openings 16 and 18, with the flanges being substantially equal in dimensions. The forwardmost flange 11 formed at the leading end of the mat is narrower in width and slightly smaller in height than the other flanges, the purpose of which will become apparent as the description of the manner of use of the mat proceeds below.

In order to keep the weight of the mat down somewhat, additional openings 19 and 20 are provided and it will be appreciated that these openings also can contribute to the functioning of the mat as well as for the convenience in gripping such as when either positioning or carrying.

For the purpose of stiffening the mat structure the outer side edges are formed with trough shaped ribs 22 which are preferably dished downwardly. It will be appreciated that the ribs 22 will also aid in avoiding side slippage in usage.

In accordance with another aspect of the present invention, there are provided a plurality of downwardly projecting V-shaped gripping members 23 which are capable of positively biting into ice or hard packed snow. The gripping members will also serve to resist simply being pulled through substances like mud or sand when used in such circumstances.

It is one of the features of the mat construction that all of the flanges 11–15 and the gripping members 23 are provided with structurally formed ribbing 24 which serves to increase their rigidity in the sense that they will not be bent out of shape or deformed under the weight of the vehicle tire being driven over the mat.

It is found that using a traction mat formed of one piece stamped 13 guage steel as described herein, the construction is sufficiently rigid to resist any deformation or dimensional change when a vehicle is driven over the mat on a concrete road surface. With the structural arrangement including the flanges and openings therebeteen, the mat can also be used as a safety chock to prevent movement of the vehicle when jacking vehicle up to perform service from underneath or to change a tire.

In addition to the operating advantages of the present construction, already discussed, the unitary stamped construction does nest together sufficiently to enable easy storage and handling of a pair of mats and there are cost economies of production, and quantity production.

In order to use the mat of the present invention, referring to FIG. 4 and assuming a wheel shown at 25 is slipping with respect to the surface 26 such as in the ice situation, the mat 10' is inserted angularly with the flange 11' pushed between the wheel and the surface 26 as tightly as may be permitted. The mat 10 may then be stepped down until the forward pair of gripping ribs 23 engage the surface. This will apply enough pressure between the ground and the tire to provide a grab enabling the tire to be driven onto the mat and then to continue if so desired over and out of the slippage problem area. The tapered forward portion and the extreme front flange 11, it will be seen render it easy to position the mat and to gain a sufficient hold to get the traction start needed.

I claim as my invention:

1. A traction mat to aid vehicle wheels for driving out of ice, snow, mud, sand and the like, comprising a unitary stamped, elongated metal member, said member having a plurality of spaced generally rectangular openings along its length, the forward portion of said member tapering inwardly toward a leading end, upwardly extending bent flanges transversely formed adjacent forward and rearward sides of said rectangular openings, an upwardly bent flange at the leading end of the mat member, the outer side edges of said member including trough shaped stiffening ribs, said generally rectangular openings having at least a pair of downwardly bent projecting gripping lugs formed at opposite sides thereof and said flanges and gripping lugs being formed with structural ribbing.

2. A traction mat as claimed in claim 1 wherein all of said flanges are oriented at 90° with respect to the planer surface and said lead end flange is lesser in height than the other flanges.

3. A traction mat as claimed in claim 1 wherein said gripping lugs are V-shaped.

4. A traction mat as claimed in claim 1 wherein said mat includes an open area between each pair of upstanding flanges.

* * * * *